United States Patent
Roh

(10) Patent No.: US 7,158,815 B2
(45) Date of Patent: Jan. 2, 2007

(54) APPARATUS AND METHOD FOR CHARGING A MOBILE DEVICE FROM ANOTHER MOBILE DEVICE

(75) Inventor: Ji-Won Roh, Kyeongki-Do (KR)

(73) Assignee: LG Electronics, Inc., Seoul (KR)

( * ) Notice: Subject to any disclaimer, the term of this patent is extended or adjusted under 35 U.S.C. 154(b) by 289 days.

(21) Appl. No.: 10/237,738

(22) Filed: Sep. 10, 2002

(65) Prior Publication Data

US 2003/0050102 A1  Mar. 13, 2003

(30) Foreign Application Priority Data

Sep. 12, 2001  (KR) ............................... 2001-56218

(51) Int. Cl.
*H04B 1/38* (2006.01)
*H04M 1/00* (2006.01)

(52) U.S. Cl. .................. 455/573; 455/572; 455/343.6; 455/343.1

(58) Field of Classification Search ............... 455/572, 455/573, 574, 575.1, 90.3, 556.1, 557, 127.1, 455/127.5, 343.1, 343.5, 343.6; 320/114, 320/115, 103, 137
See application file for complete search history.

(56) References Cited

U.S. PATENT DOCUMENTS

| | | | | |
|---|---|---|---|---|
| 5,396,538 | A * | 3/1995 | Hong | 455/573 |
| 5,731,686 | A * | 3/1998 | Malhi | 320/154 |
| 6,211,649 | B1 * | 4/2001 | Matsuda | 320/115 |
| 6,625,423 | B1 * | 9/2003 | Wang | 455/74.1 |
| 6,633,932 | B1 * | 10/2003 | Bork et al. | 710/72 |
| 6,643,527 | B1 * | 11/2003 | Satoh et al. | 455/574 |
| 6,760,600 | B1 * | 7/2004 | Nickum | 455/557 |
| 6,928,310 | B1 * | 8/2005 | Lee | 455/572 |
| 2002/0128050 | A1 * | 9/2002 | Hong et al. | 455/572 |
| 2002/0147036 | A1 * | 10/2002 | Taguchi et al. | 455/573 |
| 2003/0157974 | A1 * | 8/2003 | Lin | 455/572 |

* cited by examiner

*Primary Examiner*—Edan Orgad
(74) *Attorney, Agent, or Firm*—Fleshner & Kim, LLP

(57) ABSTRACT

An apparatus and method for allowing a mobile device with a dead battery to be charged by another mobile device with a charged battery. The apparatus and method further provide for the prevention of damage to the batteries due to overcurrents that may occur due to battery voltage differences. Light emitting diodes are also provided to indicate the state of the charging device.

37 Claims, 4 Drawing Sheets

APPARATUS AND METHOD FOR CHARGING A MOBILE DEVICE FROM ANOTHER MOBILE DEVICE

BACKGROUND OF THE INVENTION

1. Field of the Invention

The present invention generally relates to an apparatus for charging a battery of a first mobile device from a battery of a second mobile device without causing damage to these devices due to an overcurrent.

2. Background of the Related Art

Mobile devices, such as cellular phones, are gaining in popularity with consumers. Mobile devices are not completely reliant on an electrical outlet for operation. At times, mobile devices operate using power from a battery. This allows a user to use the mobile device without being restricted to the proximity of an electrical outlet. This aspect of mobile devices is attractive, as users can operate their mobile devices while they travel and are not bound to a single location.

Unfortunately, the inevitable problem with mobile devices, the battery runs out of power. When this occurs, the user is unable to operate their mobile device until the user has the opportunity to connect the mobile device to an electrical outlet through a charger. This aspect of mobile devices can be quite frustrating for users. This frustration is amplified by the increase in dependence of users on their mobile devices. Accordingly, if a mobile device will not operate due to a low battery, the productivity of an individual using the mobile device may cease or be compromised. Additional features are now being incorporated into mobile devices. For instance, mobile devices may have internet browsers, email capabilities, video games, and other software and telecommunication applications. Accordingly, these applications can run down the battery of the mobile device and the problem of a disabled mobile device due to low battery becomes more prevalent.

SUMMARY OF THE INVENTION

The object of the present invention is to at least overcome the disadvantages, discussed above, of the background art. In general, the present invention enables a mobile device with a low battery to be charged or run off of another mobile device which has sufficient battery power. Embodiments of the present invention electrically couple these two mobile devices and prevent damage from occurring to the mobile devices during this battery power transfer.

The advantages of the present invention can be easily appreciated. For example, a first user is expecting an important telephone call on their cellular phone. If the first user does not have access to an electrical outlet and the battery in their cellular telephone is dead, then the user will not be able to receive their important telephone call. However, in accordance with the methods and apparatuses of the present invention, the user may be able to charge their cellular phone off of a colleague's cellular phone or PDA so the user can receive the important telephone call.

Embodiments of the present invention relate to an apparatus. The apparatus includes a first connector and a second connector. The first connector is configured to receive battery power from a first mobile device. The second connector is configured to selectively transmit battery power to a second mobile device. Similar embodiments of the present invention relate to a method. The method comprises receiving a first connector battery power from a first mobile device and selectively transmitting a second connector battery power to a second mobile device. Aspects of the present invention are advantageous, as these embodiments of the present invention prevent damage to the mobile devices by selectively transmitting battery power to avoid overcurrents.

In embodiments of the present invention, at least one of the first mobile device and the second mobile device is a cellular phone. In other embodiments, the apparatus includes circuitry that prevents the second connector from transmitting battery power having an overcurrent.

In embodiments, a regulator, a comparator, and a transistor are utilized. In some embodiments, the regulator is a low drop out regulator and the transistor is a p-channel field effect transistor. The negative terminal of the first connector may be electrically coupled to a negative terminal of the second connector. The positive terminal of the first connector may be electrically coupled to an input terminal of the regulator. The positive terminal on the first connector may also be electrically coupled to a source input of the transistor. An output terminal of the regulator may be electrically coupled to a first input of a comparator. An output terminal of the comparator may be electrically coupled to a gate input of a transistor. A drain output of the transistor may be electrically coupled to a positive terminal of the second connector. The drain output of the transistor may be electrically coupled to the second input of the comparator. The positive terminal of the second connector may be electrically coupled to the second input of the comparator.

In embodiments of the present invention, the regulator is configured to input an electrical power signal from the first connector. The regulator also limits the voltage level of the electrical power signal to a predetermined voltage. The regulator then outputs a limited electrical power signal. In embodiments of the present invention a predetermined voltage is 2.5 volts. In embodiments of the present invention the comparator is configured to input the limited electrical power signal at the first input of the comparator. The comparator inputs an electrical power signal from the second connector at the second input of the comparator. The comparator will output a low signal from the output terminal of the comparator if the limited electrical power signal has a higher voltage level than the electrical power signal from the second connector. The comparator will output a high signal from the output signal of the comparator if the limited electrical power signal is a lower voltage level than the electrical power signal from the second connector. Accordingly, a low signal input into the drain input of the transistor enables the second connector to transmit battery power. Likewise, a high signal input into the drain input of the transistor disables the second connector from transmitting battery power.

In embodiments of the present invention the output of the regulator is electrically coupled to a first light emitting diode and the output terminal of the comparator is electrically coupled to a second light emitting diode. In other embodiments of the present invention the negative terminal of the second connector, the negative terminal of the first connector, the first light emitting diode, and the second light emitting diode are electrically coupled together.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
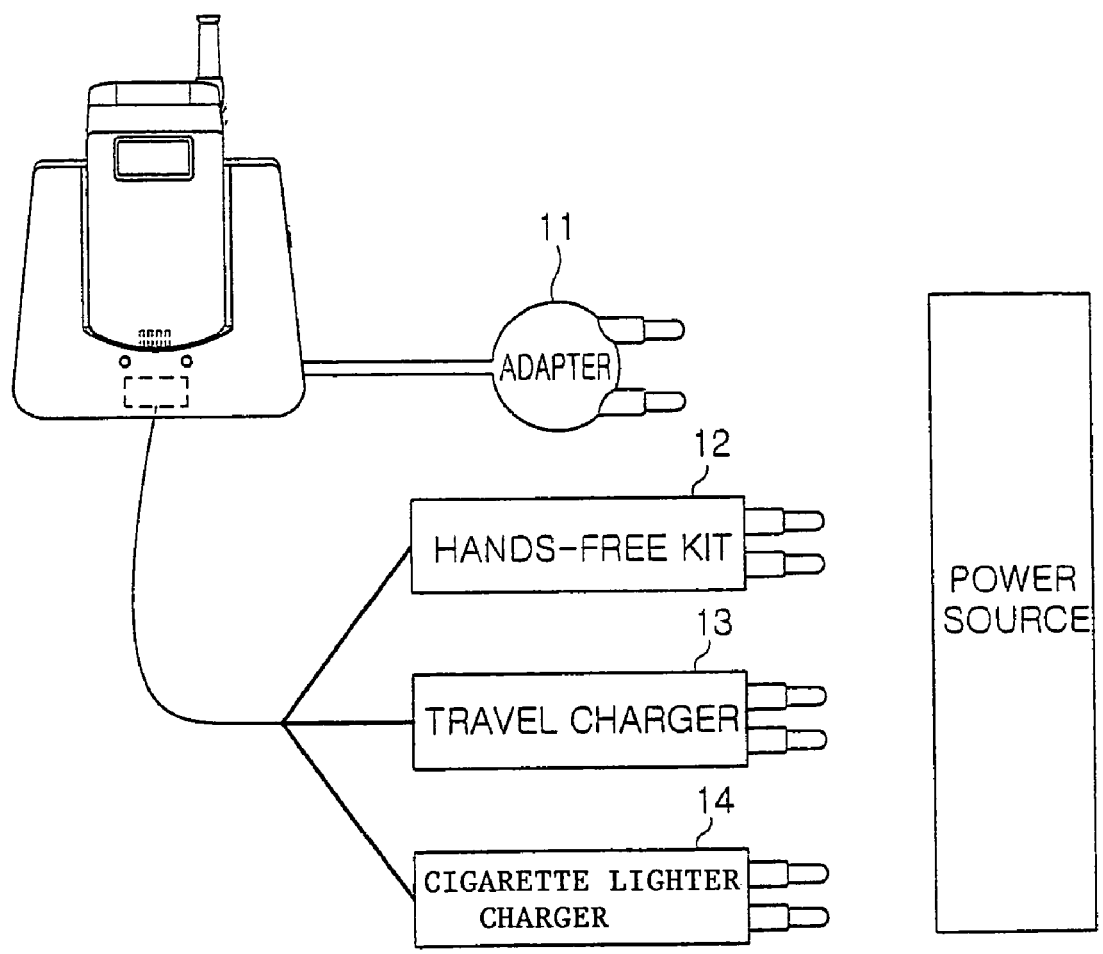
FIGS. 1 and 2 illustrate an apparatus for charging a mobile device.

FIG. 1 illustrates an apparatus for charging a mobile device. The apparatus may be a power outlet charger 11, hands-free kit 12, travel charger 13 or cigarette lighter charger 14. The power outlet charger 11 has limited mobility since it receives power from an electrical outlet (i.e., 220V or 110V). The size of the power outlet charger 11 relatively large. Accordingly, the power outlet charger 11 typically stationary in offices or homes. The travel charger 13 is similar to the power outlet charger 11 in that it receives a power from an electrical outlet (220V or 110V). However, the travel charger 13 is smaller than the power outlet charger 11 and can be conveniently carried. The cigarette lighter charger 14 receives power through a cigarette lighter jack of an automobile. The hands-free kit 12 has a sound amplifier function so a user can use a mobile device hands-free. The hands-free kit 12 are typical for cellular phones and receive power from an electrical outlet or from a battery of an automobile.

Figure 2:
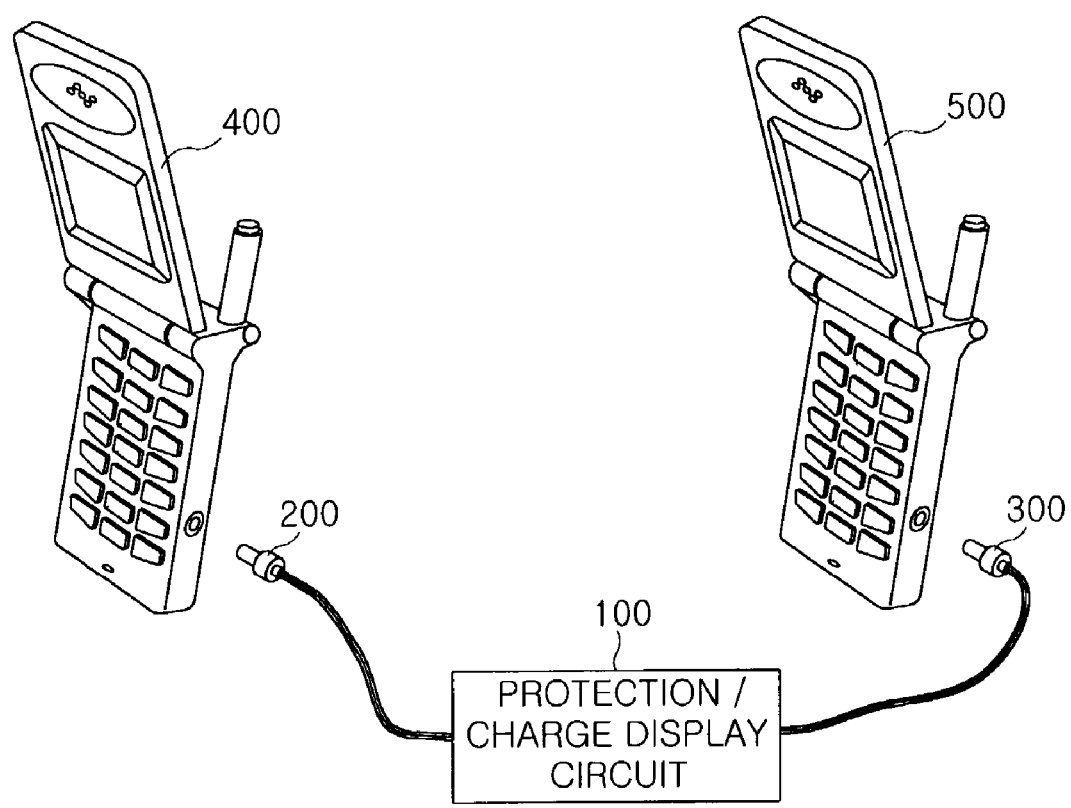

FIG. 2 illustrates an apparatus for charging a cellular phone in accordance with embodiments of the present invention. The apparatus includes a charged cellular phone 400, a discharged cellular phone 500, and phone to phone charging plugs 100, 200 and 300 (hereinafter, as 'PTP charging plug'). PTP charging plugs supply power by connecting a jack of the charged cellular phone 400 and the a jack of the discharged cellular phone 500.

Figure 3:
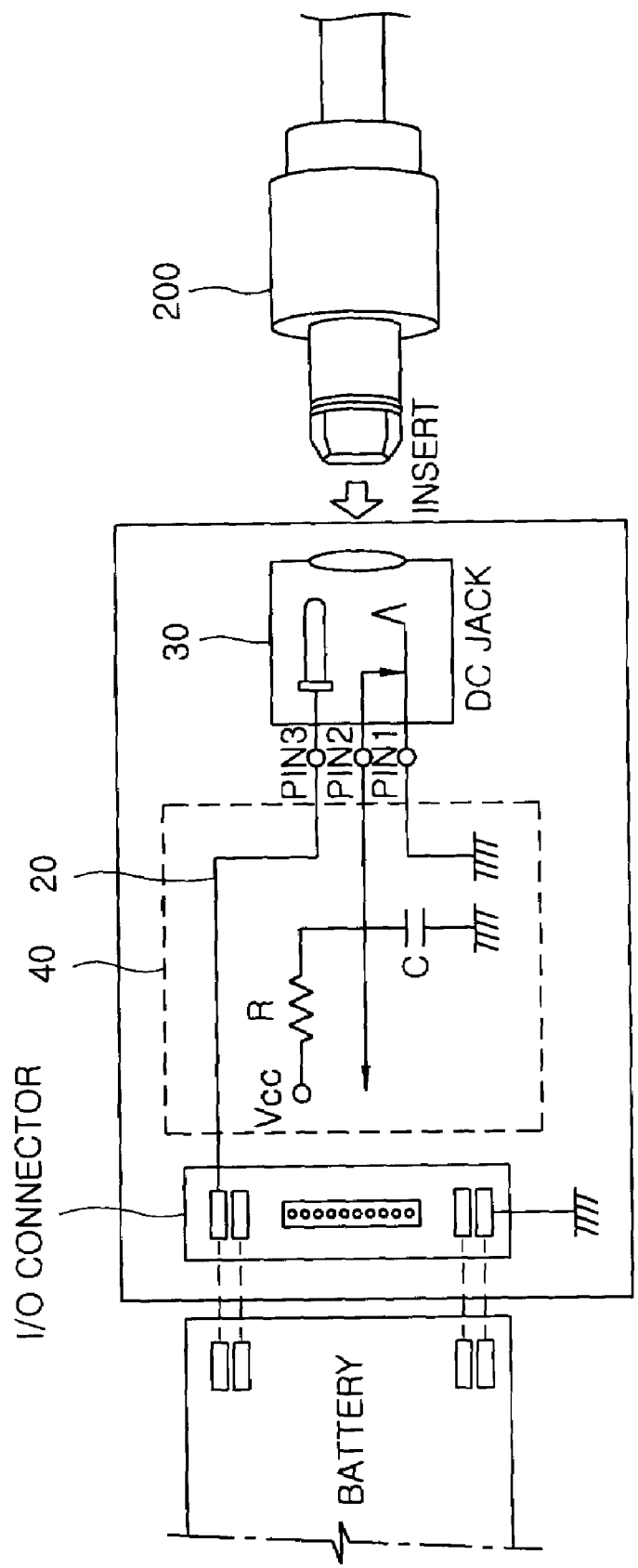
FIG. 3 illustrates a DC jack of a mobile device.

FIG. 3 illustrates a DC jack of a cellular phone in accordance with embodiments of the present invention. The cellular phones 400 and 500 include a DC jack 30 which is compatible with the charging jacks 200 and 300. The cellular phones 400 and 500 further include a jack detection unit 40 for detecting whether the charging jacks 200 and 300 are inserted. The jack detection unit 40 transmits a detected signal to a mobile station modem chipset (hereinafter, as 'MSM', not shown). The jack detection unit 40 is configured to detect whether the charging jacks 200 and 300 are inserted by connecting or disconnecting pin 2 and pin 1 of the DC jack 30. If the charging jacks 200 and 300 are not inserted, pin 2 and pin 1 are connected and the jack detection terminal 20 transmits a ground connection signal (a low level signal) to the MSM. Likewise, if the charging jacks 200 and 300 are inserted, the pin 2 and pin 1 are not connected and the jack detection terminal 20 transmits a Vcc signal (a high level signal) to the MSM. Accordingly, the MSM controls a cellular phone by detecting whether the charging jacks 200 and 300 are inserted in the DC jack 30.

Figure 4:
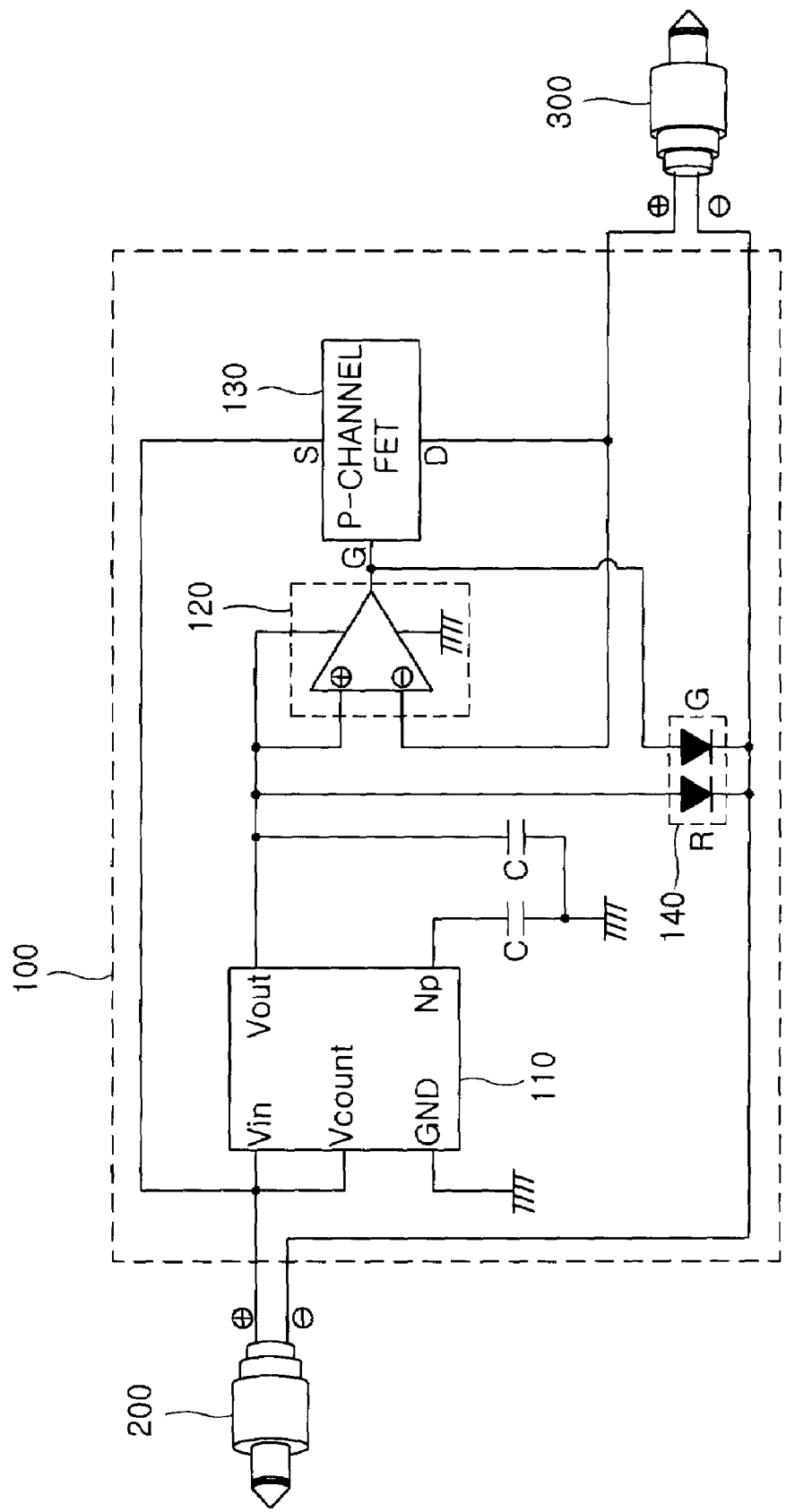
FIG. 4 is a block diagram illustrating a PTP charging plug.

FIG. 4 is a block diagram illustrating a PTP charging plug. The PTP charging plug includes a first charging jack 200, a second charging jack 300, and a protection circuit 100. The first charging jack 200 is connected to the charged cellular phone 400. The second charging jack 300 is connected to the discharged cellular phone 500. The protection circuit 100 is positioned between the first charging jack 200 and the second charging jack 300. The protection circuit 100 is configured to intercept an overcurrent which flows to the discharged cellular phone 500 through the first charging jack 200.

The protection circuit 100 includes a low drop out regulator 110. The low drop out regulator 110 outputs a signal which is limited in magnitude to a reference voltage. The positive terminal voltage of the first charging jack 200 is input (Vin) into the low drop out regulator 110. The positive terminal voltage is limited by the low drop out regulator 110 and then output (Vout) to comparator 120. The comparator 120 is configured to output a low level signal if the battery voltage of the discharged cellular phone 500 is higher than the voltage of the output signal of the low drop out regulator 110. The comparator 120 outputs a high level signal if the battery voltage of the discharged cellular phone 500 is lower than the output signal of the low drop out regulator 110. The outputting of the low level signal and the high level signal are accomplished by comparing the voltage of the output signal of the low drop out regulator 110 and the battery voltage of the discharged cellular phone 500 at the positive input and the negative input of the comparator 120.

A dual light emitting diode (LED) 140 is also included in the protection circuit 100. In embodiments, the LED 140 includes a green LED and a red LED. The green LED includes an anode that is connected to the output terminal of the comparator 120. The cathode of the green LED is connected to the negative power source of the charging plug. The red LED's anode is connected to the output terminal of the low drop out regulator 110. The cathode of the red LED is connected to the negative power source of the charging plug.

The protection circuit 100 further includes a p-channel field effect transistor (FET) 130 for controlling the transmission of power from the charged cellular phone 400 to the discharged cellular phone 500. The output of the comparator 120 is connected to the gate of FET 130. Accordingly, if the output of the comparator 120 is a low level signal, power will be transmitted between the charging cellular phone 400 and the discharging cellular phone 500. This is made possible by the positive power source of the charged cellular phone 400 being connected to the source of FET 130 and the positive power source of the charging plug of the discharged cellular phone 500 being connected to the drain of the FET 130.

When the first charging jack 200 is inserted in the DC jack 30 of the cellular phone 400, the low drop out regulator 110 checks the positive terminal voltage of the first charging jack 200. The low drop out regulator 110 outputs a signal of the reference voltage (i.e., 2.5V) if the positive terminal voltage of the first charging jack 200 is higher than the reference voltage. The low drop out regulator 110 outputs the positive terminal voltage of the first charging jack 200 if the positive terminal voltage of the first charging jack 200 is lower than the reference voltage. This is accomplished by the low drop out regulator 110 checking the positive terminal voltage of the first charging jack 200 which is connected at Vin. Since the positive terminal of the first charging jack 200 is connected with the positive terminal of the battery of the charged cellular phone 400, the signal which the low drop out regulator 110 actually outputs is a signal of the reference voltage.

The output signal of the low drop out regulator 110 is applied to the positive input terminal of the comparator 120. The positive power source of the second charging jack (the positive terminal voltage of the cellular phone 500 battery) is applied to the negative input terminal of the comparator 120. The comparator 120 outputs a high level signal if the voltage of the positive input terminal is higher than the negative terminal. The comparator 120 outputs a low level signal if the voltage of the positive input terminal is lower than the negative terminal. This is accomplished by the comparator 120 comparing voltages of the positive input terminal and negative input terminal. The output signal of the comparator 120 is applied to the gate of FET 130.

If the level of the signal which is applied to the gate of FET 130 is low, a channel is formed between the source and drain of FET 130 and a conductive state is formed in the FET 130. Consequently, the power of the cellular phone 400 is supplied to the cellular phone 500 through the PTP charging plug. Likewise, if the level of the signal which is applied to the gate FET 130 is high, a channel is not formed between the source and drain FET 130 and the power from cellular phone 400 is not supplied to the cellular phone 500.

For example, the voltage of the cellular phone 500 battery is 2.6 volt to 4.5 volt, the voltage of the negative input terminal of the comparator 120 is higher than the voltage of the positive input terminal (lower than 2.5 volt), and the reference voltage is 2.5 volts. In this example, the comparator 120 outputs a low level signal, the state of FET 130 becomes conductive, and the battery of cellular phone 500 is charged. However, if the voltage of the cellular phone 500 battery is lower than 2.4 volt, the comparator 120 outputs a high level signal, and FET 130 is non-conductive. Accordingly, the power of the cellular phone 400 is not supplied to the cellular phone 500. In other words, if the voltage of the cellular phone 400 battery is lower than 2.5 volt, voltage difference between batteries of the cellular phones 400 and 500 becomes larger. Accordingly, an overcurrent would flow in the PTP charging plug. The protection circuit 100 intercepts this overcurrent and prevents damage to the battery of the cellular phone 500.

The dual LED 140 in the protection circuit 100 displays the charging state of the cellular phone 500. For example, the dual LED 140 includes a red LED and green LED. When the red LED and green LED are both turned on, this is an indication that the operation of the charging apparatus is normal. The anode (positive terminal) of the green LED is connected to the output terminal of the comparator 120. The cathode (negative terminal) of the green LED is connected to the negative power source of the charging plug. The anode of the red LED is connected with the output terminal of the low drop out regulator 110. The cathode of the red LED is connected to the negative power source of the charging plug. Since the red LED is always on if the cellular phone is not completely discharged, the user can recognize the operation state of the charging apparatus according to the 'on-off' condition of the green LED.

The cellular phone may include both an I/O connector and DC jack 30 or just the I/O connector. The apparatus for charging the cellular phone in accordance with the present invention may be embodied by connecting with the I/O connector. The jack detection unit 40 shown in FIG. 3, may not be included in all cellular phones. Embodiments of the present invention include the jack detection unit 40. Accordingly, the MSM (not shown) can control the operation which is related with cellular phone charging. Embodiments of the present invention can be applied to cellular phones which do not include the jack detection unit 40.

Embodiments of the present invention relate to an apparatus including a charged cellular phone 400, a discharged cellular phone 500, a first charging jack 200 which is connected to the charged cellular phone 400, a second charging jack 300 which is connected to the discharged cellular phone 500, and a protection circuit 100 which is positioned between the first and second charging jacks 200 and 500, for intercepting an overcurrent which flows to the discharged cellular phone 500 through the first charging jack 200. The protection circuit includes a low drop out regulator 110 which outputs a signal which is below a reference voltage by setting a + terminal voltage of the first charging jack 200 as an input voltage, a comparator 120 for comparing a voltage of an output signal of the low drop out regulator 110 and a battery voltage of the discharged cellular phone 500 and a P channel FET 130 for controlling the conductive state by connecting a gate to the output terminal of the comparator 120, connecting a source to the first charging jack 200 and connecting a drain to the second charging jack 300.

Embodiments of the present invention relate to a method for charging a cellular phone in accordance with the present invention, including the steps of connecting a first jack 200 of a charging plug to a charged cellular phone 400, connecting a second jack 300 of a charging plug to a discharged cellular phone 500 and supplying a power of a charged cellular phone 400 to a discharged cellular phone 500 through the charging plug. The step of supplying a power further includes a step of intercepting an overcurrent which flows to the discharged cellular phone 500 by the charging plug. Also, the step of intercepting the overcurrent further includes the steps of dropping a voltage for outputting a signal of a reference voltage in case the voltage of the + terminal of the first jack 200 is higher than the reference voltage, and outputting a signal of the corresponding input voltage in case the input voltage is lower than the reference voltage, comparing voltage for outputting a lower level signal in case the battery voltage of the discharged cellular phone is higher, and outputting a high level signal in case the battery voltage of the discharged cellular phone 500 is lower, by comparing the output signal voltage and the battery voltage of the discharged cellular phone 500 in the voltage dropping step and supplying a power to the discharged cellular phone 500 in case the level of the output signal in the step of comparing voltage is low and intercepting supply of the power to the discharged cellular phone 500 in case the level of the output signal in the step of comparing voltage is high.

As described above, the apparatus for charging the cellular phone in accordance with the present invention can cope with unexpected cellular phone discharging. Particularly, the present invention is accomplished by enabling charging between cellular phones. The apparatus can be conveniently carried. Damage to the battery of the cellular phone can be prevented since the apparatus contains a protection circuit.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus, comprising:
    a first connector configured to receive battery power from a first mobile device;
    a second connector configured to selectively transmit battery power to a second mobile device; and
    a comparator configured to compare an input voltage level of the first mobile device transmitted from a regulator, an input voltage level of the second mobile device received from the second mobile device, and a reference voltage level, wherein the input voltage level transmitted by the regulator is less than or equal to the reference voltage level, wherein the second connector is configured to transmit battery power to the second mobile device if the input voltage level of the first mobile device or the reference voltage level is less than the input voltage level of the second mobile device, and to restrict a flow of battery power to the second mobile device if the input voltage level of the first mobile device or the reference voltage level is greater than the input voltage level of the second mobile device, in response to a signal generated by a transistor based on a comparison of the input voltage levels of the first and second mobile devices and the reference voltage level.

2. The apparatus of claim 1, wherein at least one of the first mobile device and the second mobile device is a cellular telephone.

3. The apparatus of claim 2, wherein both the first mobile device and the second mobile device are cellular telephones.

4. The apparatus of claim 1, further comprising circuitry configured to prevent the second connector from transmitting battery power having an overcurrent.

5. The apparatus of claim 1, wherein the regulator is a low drop out regulator.

6. The apparatus of claim 1, wherein the transistor is a p-channel field effect transistor.

7. The apparatus of claim 1, wherein:
a negative terminal of the first connector is electrically coupled to a negative terminal of the second connector;
a positive terminal of the first connector is electrically coupled to an input terminal of the regulator;
the positive terminal of the first connector is electrically coupled to a source input of the transistor;
an output terminal of the regulator is electrically coupled to a first input of the comparator;
an output terminal of the comparator is electrically coupled to a gate input of the transistor;
a drain output of the transistor is electrically coupled to a positive terminal of the second connector;
the drain output of the transistor is electrically coupled to a second input of the comparator; and
the positive terminal of the second connector is electrically coupled to the second input of the comparator.

8. The apparatus of claim 7, wherein the regulator is configured to:
input an electrical power signal from the first connector;
limit the voltage level of the electrical power signal to a predetermined voltage; and
output a limited electrical power signal.

9. The apparatus of claim 8, wherein the predetermined voltage is 2.5 volts.

10. The apparatus of claim 8, wherein the comparator is configured to:
input the limited electrical power signal at the first input of the comparator;
input an electrical power signal from the second connector at the second input of the comparator;
output a low signal from the output terminal of the comparator if the limited electrical power signal has a higher voltage level than the electrical power signal from the second connector; and
output a high signal from the output terminal of the comparator if the limited electrical power signal has a lower voltage level than the electrical power signal from the second connector, wherein the low signal input into the drain input of the transistor enables the second connector to transmit battery power, and the high signal input into the drain input of the transistor disables the second connector from transmitting battery power.

11. The apparatus of claim 7, wherein:
the output terminal of the regulator is electrically coupled to a first light emitting diode; and
the output terminal of the comparator is electrically coupled to a second light emitting diode.

12. The apparatus of claim 11, wherein the negative terminal of the first connector, the negative terminal of the second connector, the first light emitting diode, and the second light emitting diode are all electrically coupled together.

13. A method, comprising:
receiving at a first connector battery power from a first mobile device;
comparing in a comparator an input voltage level of the first mobile device received from a regulator which is less than or equal to a reference voltage level, an input voltage level of a second mobile device coupled to the first mobile device, and the reference voltage level; and
selectively transmitting at a second connector battery power to the second mobile device in response to a signal generated by a transistor based on the comparison made by the comparator, comprising:
transmitting battery power to the second mobile device if the input voltage level of the first mobile device or the reference voltage level is less than the input voltage level of the second mobile device; and
restricting a flow of battery power to the second mobile device if the input voltage level of the first mobile device or the reference voltage level is greater than the input voltage level of the second mobile device.

14. The method of claim 13, wherein at least one of the first mobile device and the second mobile device is a cellular telephone.

15. The method of claim 14, wherein both the first mobile device and the second mobile device are cellular telephones.

16. The method of claim 13, further comprising preventing the second connector from transmitting battery power having an overcurrent.

17. The method of claim 16, wherein preventing the second connector from transmitting battery power having an overcurrent utilizes the regulator, the comparator; and the transistor.

18. The method of claim 17, wherein the regulator is a low drop out regulator.

19. The method of claim 17, wherein the transistor is a p-channel field effect transistor.

20. The method of claim 17, wherein:
a negative terminal of the first connector is electrically coupled to a negative terminal of the second connector;
a positive terminal of the first connector is electrically coupled to an input terminal of the regulator;
the positive terminal of the first connector is electrically coupled to a source input of the transistor;
an output terminal of the regulator is electrically coupled to a first input of the comparator;
an output terminal of the comparator is electrically coupled to a gate input of the transistor;
a drain output of the transistor is electrically coupled to a positive terminal of the second connector;
the drain output of the transistor is electrically coupled to a second input of the comparator; and
the positive terminal of the second connector is electrically coupled to the second input of the comparator.

21. The method of claim 20, wherein the regulator is configured to:
input an electrical power signal from the first connector;
limit the voltage level of the electrical power signal to a predetermined voltage; and
output a limited electrical power signal.

22. The method of claim 21, wherein the predetermined voltage is 2.5 volts.

23. The method of claim 21, wherein the comparator is configured to:
input the limited electrical power signal at the first input of the comparator;
input an electrical power signal from the second connector at the second input of the comparator;
output a low signal from the output terminal of the comparator if the limited electrical power signal has a higher voltage level than the electrical power signal from the second connector; and
output a high signal from the output terminal of the comparator if the limited electrical power signal has a lower voltage level than the electrical power signal from the second connector, wherein the low signal input into the drain input of the transistor enables the second connector to transmit battery power, and the high signal input into the drain input of the transistor disables the second connector from transmitting battery power.

24. The method of claim 20, wherein:
the output terminal of the regulator is electrically coupled to a first light emitting diode; and
the output terminal of the comparator is electrically coupled to a second light emitting diode.

25. The method of claim 24, wherein the negative terminal of the first connector, the negative terminal of the second connector, the first light emitting diode, and the second light emitting diode are all electrically coupled together.

26. An apparatus, comprising:
a first connector configured to receive battery power from a first mobile device;
a second connector configured to selectively transmit battery power to a second mobile device;
a regulator;
a comparator; and
a transistor, wherein:
a negative terminal of the first connector is electrically coupled to a negative terminal of the second connector;
a positive terminal of the first connector is electrically coupled to an input terminal of the regulator;
the positive terminal of the first connector is electrically coupled to a source input of the transistor;
an output terminal of the regulator is electrically coupled to a first input of the comparator;
an output terminal of the comparator is electrically coupled to a gate input of the transistor;
a drain output of the transistor is electrically coupled to a positive terminal of the second connector;
the drain output of the transistor is electrically coupled to a second input of the comparator; and
the positive terminal of the second connector is electrically coupled to the second input of the comparator.

27. The apparatus of claim 26, wherein the second connector is configured to transmit battery power to the second mobile device if an input voltage level of the first mobile device or a reference voltage level is less than an input voltage level of the second mobile device, and to restrict a flow of battery power to the second mobile device if the input voltage level of the first mobile device or the reference voltage level is greater than the input voltage level of the second mobile device.

28. The apparatus of claim 26, wherein the regulator is configured to:
input an electrical power signal from the first connector;
limit the voltage level of the electrical power signal to a predetermined voltage; and
output a limited electrical power signal.

29. The apparatus of claim 28, wherein the comparator is configured to:
input the limited electrical power signal at the first input of the comparator;
input an electrical power signal from the second connector at the second input of the comparator;
output a low signal from the output terminal of the comparator if the limited electrical power signal has a higher voltage level than the electrical power signal from the second connector; and
output a high signal from the output terminal of the comparator if the limited electrical power signal has a lower voltage level than the electrical power, signal from the second connector, wherein the low signal input into the drain input of the transistor enables the second connector to transmit battery power, and the high signal input into the drain input of the transistor disables the second connector from transmitting battery power.

30. The apparatus of claim 26, wherein the output terminal of the regulator is electrically coupled to a first light emitting diode, and the output terminal of the comparator is electrically coupled to a second light emitting diode.

31. The apparatus of claim 30, wherein the negative terminal of the first connector, the negative terminal of the second connector, the first light emitting diode, and the second light emitting diode are all electrically coupled together.

32. A method, comprising:
receiving at a first connector battery power from a first mobile device; and
selectively transmitting at a second connector battery power to a second mobile device; and
preventing the second connector from transmitting battery power having an overcurrent utilizing a regulator, a comparator and a transistor, wherein:
a negative terminal of the first connector is electrically coupled to a negative terminal of the second connector;
a positive terminal of the first connector is electrically coupled to an input terminal of the regulator;
the positive terminal of the first connector is electrically coupled to a source input of the transistor;
an output terminal of the regulator is electrically coupled to a first input of the comparator;
an output terminal of the comparator is electrically coupled to a gate input of the transistor;
a drain output of the transistor is electrically coupled to a positive terminal of the second connector;
the drain output of the transistor is electrically coupled to a second input of the comparator; and
the positive terminal of the second connector is electrically coupled to the second input of the comparator.

33. The apparatus of claim 32, wherein selectively transmitting at a second connector battery power to a second mobile device comprises:

transmitting battery power to the second mobile device if an input voltage level of the first mobile device or a reference voltage level is less than an input voltage level of the second mobile device; and restricting a flow of battery power to the second mobile device if the input voltage level of the first mobile device or the reference voltage level is greater than the input voltage level of the second mobile device.

34. The method of claim 32, wherein the regulator is configured to:

input an electrical power signal from the first connector;

limit the voltage level of the electrical power signal to a predetermined voltage; and output a limited electrical power signal.

35. The method of claim 34, wherein the comparator is configured to:

input the limited electrical power signal at the first input of the comparator;

input an electrical power signal from the second connector at the second input of the comparator;

output a low signal from the output terminal of the comparator if the limited electrical power signal has a higher voltage level than the electrical power signal from the second connector; and output a high signal from the output terminal of the comparator if the limited electrical power signal has a lower voltage level than the electrical power signal from the second connector, wherein the low signal input into the drain input of the transistor enables the second connector to transmit battery power, and the high signal input into the drain input of the transistor disables the second connector from transmitting battery power.

36. The method of claim 32, wherein the output terminal of the regulator is electrically coupled to a first light emitting diode, and the output terminal of the comparator is electrically coupled to a second light emitting diode.

37. The method of claim 36, wherein the negative terminal of the first connector, the negative terminal of the second connector, the first light emitting diode, and the second light emitting diode are all electrically coupled together.

* * * * *